US008641931B2

(12) United States Patent
Ginley et al.

(10) Patent No.: US 8,641,931 B2
(45) Date of Patent: Feb. 4, 2014

(54) METAL INKS

(75) Inventors: David S. Ginley, Evergreen, CO (US);
Calvin J. Curtis, Lakewood, CO (US);
Alex Miedaner, Boulder, CO (US);
Marinus Franciscus Antonius Maria van Hest, Lakewood, CO (US); Tatiana Kaydanova, Montreal (CA)

(73) Assignee: Alliance for Sustainable Energy, LLC, Golden, CO (US)

( * ) Notice: Subject to any disclaimer, the term of this patent is extended or adjusted under 35 U.S.C. 154(b) by 0 days.

(21) Appl. No.: 13/492,567

(22) Filed: Jun. 8, 2012

(65) Prior Publication Data

US 2013/0011957 A1    Jan. 10, 2013

Related U.S. Application Data

(62) Division of application No. 12/719,285, filed on Mar. 8, 2010, now abandoned, which is a division of application No. 11/427,270, filed on Jun. 28, 2006, now abandoned.

(51) Int. Cl.
*H01B 1/12* (2006.01)
*H01L 31/00* (2006.01)
*H01L 21/00* (2006.01)

(52) U.S. Cl.
USPC ............................ 252/519.3; 136/256; 438/72

(58) Field of Classification Search
USPC .................. 252/500, 519.3; 136/256; 438/72
See application file for complete search history.

(56) References Cited

U.S. PATENT DOCUMENTS

| | | |
|---|---|---|
| 5,711,803 A | 1/1998 | Pehnt et al. |
| 6,126,740 A | 10/2000 | Schulz et al. |
| 6,436,305 B1 | 8/2002 | Schulz et al. |
| 6,830,778 B1 | 12/2004 | Schulz et al. |
| 6,951,666 B2 | 10/2005 | Kodas et al. |
| 7,014,979 B2 | 3/2006 | Byun et al. |
| 8,093,491 B2 | 1/2012 | Sridharan et al. |
| 2004/0261839 A1* | 12/2004 | Gee et al. ............ 136/256 |
| 2005/0078158 A1 | 4/2005 | Magdassi et al. |
| 2005/0277274 A1 | 12/2005 | Karkkainen |
| 2006/0001726 A1 | 1/2006 | Kodas et al. |
| 2006/0043346 A1 | 3/2006 | Kodas et al. |
| 2006/0060757 A1 | 3/2006 | Takiba et al. |

(Continued)

FOREIGN PATENT DOCUMENTS

WO    2007001468 A3    1/2007
WO    2009059302 A1    5/2009

OTHER PUBLICATIONS

Calvert, "Inkjet Printing for Materials and Devices," Chem. Matter, 2001, vol. 13, pp. 3299-3305, American Chemical Society.

(Continued)

*Primary Examiner* — Mark Kopec
*Assistant Examiner* — Jaison Thomas
(74) *Attorney, Agent, or Firm* — Paul J. White

(57) ABSTRACT

Self-reducing metal inks and systems and methods for producing and using the same are disclosed. In an exemplary embodiment, a method may comprise selecting a metal-organic (MO) precursor, selecting a reducing agent, and dissolving the MO precursor and the reducing agent in an organic solvent to produce a metal ink that remains in a liquid phase at room temperature. Metal inks, including self-reducing and fire-through metal inks, are also disclosed, as are various applications of the metal inks.

20 Claims, 8 Drawing Sheets

(56) References Cited

U.S. PATENT DOCUMENTS

| | | |
|---|---|---|
| 2006/0208257 A1 | 9/2006 | Branz et al. |
| 2006/0231804 A1 | 10/2006 | Wang et al. |
| 2007/0163634 A1 | 7/2007 | Wada et al. |
| 2008/0003364 A1 | 1/2008 | Ginley et al. |
| 2009/0188556 A1* | 7/2009 | Castillo et al. ............... 136/256 |
| 2009/0283141 A1 | 11/2009 | Bentzen et al. |
| 2010/0163810 A1 | 7/2010 | Ginley et al. |
| 2010/0209594 A1 | 8/2010 | Curtis et al. |
| 2010/0300522 A1 | 12/2010 | Ginley et al. |
| 2012/0288991 A1* | 11/2012 | Abed et al. ...................... 438/98 |

OTHER PUBLICATIONS

Curtis, "Metallizations by Direct-Write Inkjet Printing," 2001, NREL/CP-520-31020, pp. 1-4, National Renewable Energy Laboratory, Golden, Colorado, U.S.A.

Di Risio, et al., "Piezoelectric Ink-Jet Printing of Horseradish Peroxidase: Effect of Ink Viscosity Modifiers on Activity," Macromolecular Rapid Communications, 2007, vol. 28, pp. 1934-1940, Wiley-VCH GmbH & Co. KGaA, Weinheim.

Ginley, at al., "Inkjet Direct Write Solar Cells," Dec. 7, 2005, Contract Number, RD-93, Report No. 1, National Renewable Energy Laboratory, Golden, Colorado, U.S.A.

Ginley, et al., "Inkjet Direct Write Solar Cells," Feb. 6, 2006, Contract RD-93, Report No. 3, National Renewable Energy Laboratory, Golden, Colorado, U.S.A.

Jang, et al., "Influence of Fluid Physical Properties on Ink-Jet Printability," Langmuir, 2009, vol. 25, pp. 2629-2635, American Chemical Society.

Kang, "Water-Based Ink-Jet Ink. I. Formulation," Journal of Imaging Science, May/Jun. 1991, vol. 35, No. 3, pp. 179-188, IS&T—The Society for Imaging Science and Technology.

Kang, "Water-Based Ink-Jet Ink. II. Characterization," Journal of Imaging Science, May/Jun. 1991, vol. 35, No. 3, pp. 189-194, IS&T—The Society for Imaging Science and Technology.

Kang, "Water-Based Ink-Jet Ink. III. Performance Studies," Journal of Imaging Science, May/Jun. 1991, vol. 35, No. 3, pp. 195-201, IS&T—The Society for Imaging Science and Technology.

Kaydanova et al., Direct Write Contacts for Solar Cells, Conference Paper, Feb. 2005, NREL/CP=520-37524, pp. 1-5, National Renewable Energy Laboratory, Golden, Colorado, U.S.A.

Kaydanova et al., "Ink Jet Printing Approaches to Solar Cell Contacts, PV and Solar Program Review Meeting 2003," Mar. 2003, NREL/CD-520-33686, pp. 1-10, National Renewable Energy Laboratory, Golden, Colorado, U.S.A.

Yancey, "Direct Write Metallizations with Organometallic Inks," Aug. 18, 2000, DOE Energy Research Undergraduate Laboratory Fellowship, pp. 1-19, National Renewable Energy Laboratory, Golden, Colorado, U.S.A.

Schubert et al., "Current Transport Mechanism in Printed AG Thick Film Contact to an N-Type Emitter of a Crystalline Silicon Solar Cell," 19th European Solar Energy Conference and Exhibition, Jun. 7-11, 2004, Paris, France.

Rivkin et al., "Direct Write Processing for Photovoltaic Cells," 12th Workshop on Crystalline Silicon Solar Cell Materials and Processes, Aug. 2002, National Renewable Energy Laboratory/BK-520-32717, pp. 1326-1329.

Hoornstra et al., "Lead Free Metallisation Paste for Crystalline Silicon Solar Cells: From Model to Results," Conference Record of the Thirty-First IEEE Photovoltaic Specialists Conference, Orlando, FL, Jan. 3-7, 2005, pp. 1293-1296.

Ballif et al., "Silver-thick-film contacts on highly doped n-type silicon emitters: Structural and electronic properties of the interface," Applied Physics Letters, vol. 82, Issue 12, pp. 1878-1880 (2003).

Sridharan et al., "Lead Free Silver Front Contact Pastes for SiNx Coated Polycrystalline Silicon Solar Cells," International PVSEC-15, Shanghai, China (2005) pp. 1-2.

International SR and WO, dated Jan. 6, 2009, for International Application PCT/US08/82261.

Hoornstra, et al., "Lead free metallisation for silicon solar cells: results from the EC2Contact project," 20th European Photovoltaic Solar Energy Conference, Jun. 6-10, 2005, Barcelona, Spain.

USPTO non-final office action, dated Oct. 7, 2011, for NREL 03-03A, U.S. Appl. No. 12/719,285.

USPTO final rejection, dated Nov. 28, 2008, for NREL 03-03, U.S. Appl. No. 11/427,270.

USPTO non-final office action, dated Jun. 13, 2008, for NREL 03-03, U.S. Appl. No. 11/427,270.

USPTO non-final office action, dated Jun. 23, 2009, for NREL 03-03, U.S. Appl. No. 11/427,270.

Jiang, et al., "Ethylene glycol-mediated synthesis of metal oxide nanowires," J. Mater. Chem. 2004, 14, 695-703.

USPTO non-final office action, dated Oct. 25, 2012, for NREL 07-06, U.S. Appl. No. 12/745,400.

* cited by examiner

METAL INKS

CONTRACTUAL ORIGIN

The United States Government has rights in this invention under Contract No. DE-AC36-08GO28308 between the United States Department of Energy and the Alliance for Sustainable Energy, LLC, the Manager and Operator of the National Renewable Energy Laboratory.

CROSS-REFERENCE TO RELATED APPLICATIONS

This application claims priority to divisional patent application Ser. No. 12/719,285 filed Mar. 8, 2010, which is incorporated herein by reference in its entirety.

SUMMARY

The following embodiments and aspects thereof are described and illustrated in conjunction with systems, tools and methods that are meant to be exemplary and illustrative, not limiting in scope. In various embodiments, one or more of the above-described problems have been reduced or eliminated, while other embodiments are directed to other improvements.

An exemplary method comprises the steps of selecting a metal-organic (MO) precursor which is non-reacting at room temperature the MO precursors are configured or arranged to have a metal ion that is reduced to a pure metallic state at a potential positive of a reduction potential of the reducing agent, which includes formate ions; electing a reducing agent which is non-reacting at room temperature; reacting the MO precursor and the reducing agent at an activating temperature in the range of about 150-250° C. wherein reacting the MO precursor and the reducing agent produces substantially pure metal deposits on a substrate; and dissolving the MO precursor and the reducing agent in an organic solvent to produce a metal ink that remains in a liquid phase at room temperature; the organic solvent is selected from a group of organic solvents that have a sufficiently high boiling point so as to remain in a liquid phase at room temperature and provide viscosity and wetting properties for inkjet printing. The exemplary method further comprises elevating the temperature of the metal ink; reacting the reducing agent with the MO precursor; and producing a substantially uncontaminated metal deposit on a substrate.

Another exemplary method comprises the steps of providing a metal ink in a liquid phase at room temperature; and applying the metal ink to a substrate at an elevated temperature by at least one of the following processes: spraying, dipping, spinning, direct-write deposition, and/or inkjet printing, wherein the metal ink reacts in a single step at the elevated temperature to produce substantially pure metal deposits on the substrate.

A further exemplary method comprises the steps of providing a fire-through metal ink in a liquid phase at room temperature; and applying the fire-through metal ink to a coated surface or substrate of a solar cell by at least one of the following processes: spraying, dipping, spinning, direct-write deposition, and/or inkjet printing, wherein the fire-through metal ink reacts with the coated surface of the solar cell to produce electrical contacts with a p-n layer beneath the coated surface of the solar cell.

An exemplary metal ink may be produced in accordance with the methods described above wherein the metal ink forms metal deposits at elevated temperatures and wherein the metal deposits consist of copper (Cu), gold (Au), silver (Ag), lead (Pb), palladium (Pd), platinum (Pt), cobalt (Co), iron (Fe), Tin (Sn), and other metal alloys. Additionally self-reducing and fire-through metal inks may be produced according to the exemplary methods described above. The fire-through metal ink further comprises a soluble metal complex and soluble organo-metallic reagent in a solution containing a particulate metal or metal organic precursor at room temperature, In addition to the exemplary aspects and embodiments described above, further aspects and embodiments will become apparent by reference to the drawings and by study of the following descriptions.

BRIEF DESCRIPTION OF THE DETAILED DRAWINGS

Exemplary embodiments are illustrated in referenced figures of the drawings. It is intended that the embodiments and figures disclosed herein are to be considered illustrative rather than limiting.

DESCRIPTION

Deposition techniques, such as, e.g., vacuum deposition, screen printing and electroplating, are used for depositing a variety of inorganic and organic electronic materials on a substrate. As disclosed herein, inkjet printing is a viable, low-cost alternative to these deposition approaches. Inkjet printing is capable of producing high-resolution deposits on a substrate without the need for masking or templates. Inkjet printing is also a "non-contact" deposition technique (i.e., there is no contact between the print head and the substrate), making it well suited for producing metal deposits on thin and/or fragile polycrystalline substrates which could otherwise break using "contact" deposition techniques. In addition, inkjet printing may be used to produce three-dimensional (3-D) metal deposits on substrates.

Briefly, metal inks disclosed herein are well suited for inkjet printing on any of a wide variety of substrates. For example, the printed inks adhere well to glass, silicon (Si), printed circuit boards (PCB), and many other substrates. The metal inks undergo a reducing reaction wherein pure, highly conductive metal deposits on the substrates at relatively low temperatures. Inkjet printing the metal inks enables the controlled deposition of metal lines and grids, in addition to multi-layer and multi-component metal features on the substrates.

The metal inks may also be readily tailored for a variety of different uses, e.g., by addition of adhesion promoters, doping compounds, and/or other additives that further enhance the mechanical and/or electronic properties of the resulting metal deposit. For example, the metal inks may include etching agents for use in the production of high efficiency solar cells. Exemplary metal inks, and systems and methods for production and use of the metal inks, may be better understood with reference to the figures and following discussion.

Figure 1:
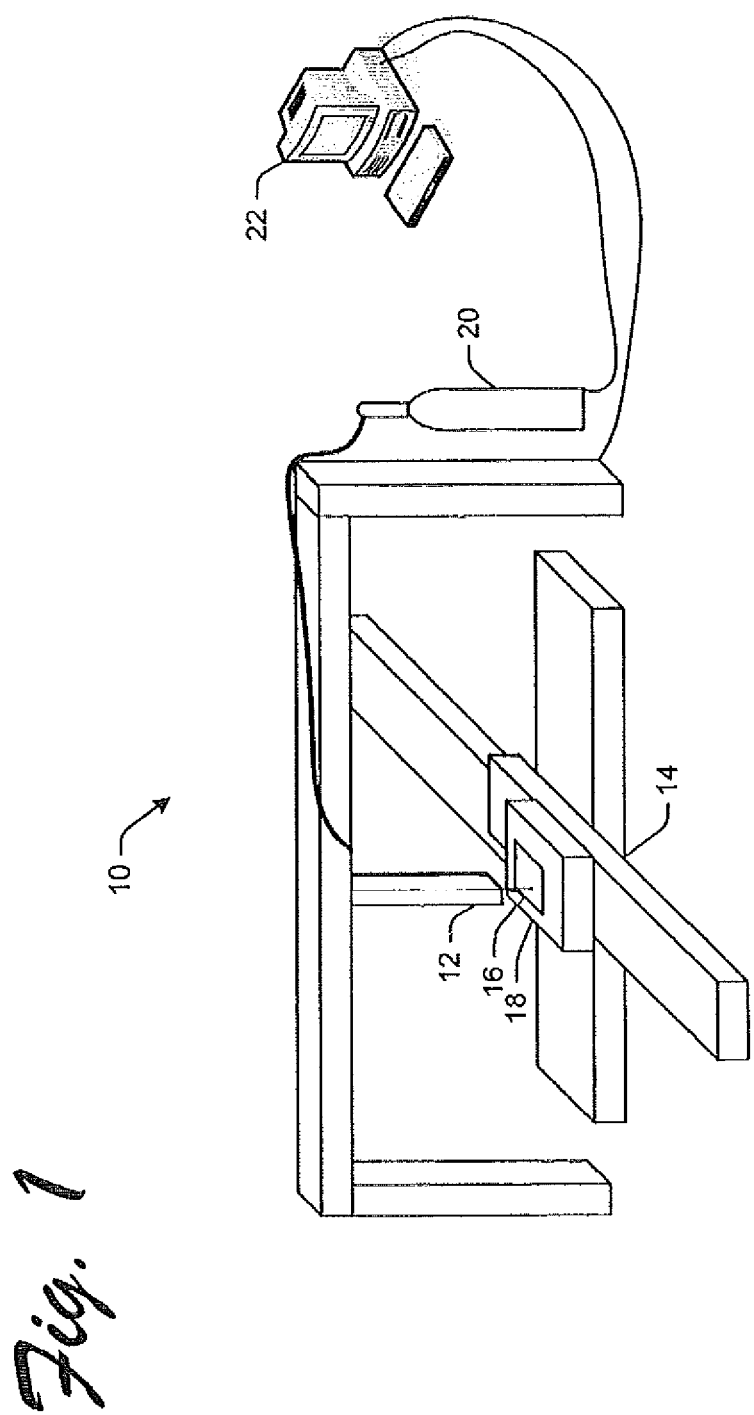
FIG. 1 is a block diagram illustrating an exemplary system which may be implemented for inkjet printing of metal inks on various substrates.

FIG. 1 is a block diagram illustrating an exemplary system 10 which may be implemented for inkjet printing of metal inks on various substrates. The exemplary system 10 may include an ink jet 12 and a translation stage 14 for positioning a substrate 16 (e.g., in the X or Y directions) adjacent the ink jet 12. A heating element 18 may also be provided, e.g., on the translation stage 14 directly adjacent the substrate 16. One or more optional gas supplies (illustrated in FIG. 1 by gas cylinder 20 and attached supply lines) may also be provided for controlling atmospheric conditions for printing the metal inks on the substrate 16. For example, the gas supplies may be used to provide an inert (e.g., nitrogen or argon) atmosphere during the inkjet printing process.

Exemplary system 10 may also include a controller 22. Controller 22 may be implemented to control various process parameters, such as, e.g., operation of the translation stage 14 to position the substrate 16 adjacent the ink jet 12, application rate of the metal inks by the ink jet 12 onto the substrate 16, increasing/decreasing temperature of the heating element 18, and/or application of one or more gasses from the gas supplies.

In an exemplary embodiment, the controller 22 may be implemented as a desktop or laptop personal computer (PC) executing control software developed using LabVIEW. LabVIEW is a graphical programming language available from National Instruments (NI) for data acquisition and instrumentation control. Such control software may be readily developed by one having ordinary skill in the art after becoming familiar with the teachings herein. Therefore, further discussion is not needed to fully enable the controller 22. It is noted, however, that any suitable controller 22 may be implemented and is not limited to a PC executing software developed with LabVIEW.

In an exemplary embodiment, the ink jet 12 may be implemented as a piezoelectric print head (commercially available from MicroFab Technologies, Inc., Plano, Tex., 75074). The print head may have a 30-50 μm orifice and may be operated using a piezoelectric actuator for ejecting the ink, e.g., at a drop generation rate of up to about 2000 Hertz (Hz).

Inkjet printing of metal inks enables direct production of patterned deposits on the substrate 16 using a non-vacuum process that produces results comparable to those obtained using traditional vacuum-based techniques. In addition, inkjet printing is a non-contact process which enables production of patterned deposits on thin and/or fragile substrates 16 that could not otherwise be accomplished using traditional contact-based techniques. It is noted, however, that other techniques for applying the metal inks to the substrate are also contemplated. Other direct application techniques may include, but are not limited to spraying, dipping, and/or spinning techniques.

Figure 2:
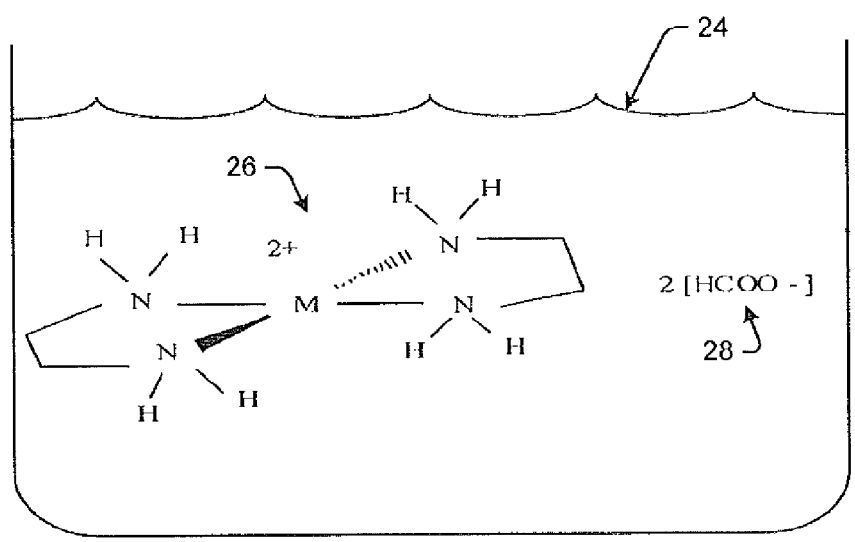
FIG. 2 is a conceptual view of an exemplary metal ink.

FIG. 2 is a conceptual view of an exemplary metal ink. Exemplary metal inks may comprise one or more metal-organic (MO) precursors (illustrated by molecular structure 26) and a reducing agent (illustrated by the formate ion 28) dissolved in water or other solvent 24. The metal ion (M) may be a chelated metal with a set of ligands that readily decompose to impart solubility to solution. Such an embodiment is well-suited for processing by inkjet printing or other direct application techniques.

The solvent 24 may be selected based on a number of design considerations. For example, the polarity of the solvent 24 may be selected based on the solubility of the MO precursor 26. The viscosity of the solvent 24 may be selected based on the stability of the metal ink. Other factors may include, but are not limited to desired boiling point, evaporation rate, viscosity, and surface tension. For example, the solvent 24 may have a high boiling point so that it does not change to a gas phase during the inkjet printing process. The solvent 24 may also be selected such that it provides the desired viscosity and wetting properties suitable for inkjet printing. Exemplary solvents include, but are not limited to, polyethers (di-glymes, triglymes, tetraglymes), ethylene glycol mono- and bis alkyl ethers, ethylene glycol, alcohols, aldehydes, water, surfactants, and/or combinations thereof.

A wide variety of MO precursors 26 may be used for producing the metal inks. In an exemplary embodiment, the MO precursor includes a metal ion (M) that is reduced to its pure metallic state at a potential positive of the reduction potential of the reducing agent (e.g., −0.20 V for formate). Accordingly, metal inks may be produced for copper (Cu), gold (Au), silver (Ag), lead (Pb), palladium (Pd), platinum (Pt), cobalt (Co), iron (Fe), tin (Sn), and metal alloys.

The reducing agent (e.g., formate ion 28) provides a counter-ion for reaction with the MO precursor 26. At room temperature, the reducing agent does not react with the MO precursor 26. Accordingly, the MO precursor 26 may remain soluble, e.g., as a metal ink solution 24 that is suitable for inkjet printing. During the inkjet printing process, however, the temperature of the metal ink solution 24 is elevated to an activating temperature (e.g., in the range of about 150-250° C.). This activating temperature causes the reducing agent to react with the MO precursor 26 and form pure metal deposits on the substrate.

In an exemplary embodiment, formate ($HCO_2^-$) 28 may be used as the reducing agent. During the inkjet printing process, the temperature of the metal ink is elevated, causing the formate ions to react with the MO precursor 26. This reaction produces an uncontaminated metal deposit on the substrate, along with a carbon dioxide ($CO_2$) byproduct. It is noted, however, that formate is merely an example of a reducing agent that may be used. Other reducing agents may also be used, such as, e.g., halide or nitrate salts, alcohols, aldehydes, acetals, ethylene glycol, ethylene glycol diformate, benzaldehyde, acetealdehyde, etc.

In alternative embodiments, reducing conditions may be applied in a second step following application of the metal ink. For example, the MO precursor 26 may be deposited on the substrate at temperatures below about 100° C., and then in a second step, annealed with a forming gas or vapors of organic reducing agents (e.g., ethylene, glycol, formaldehyde, acetaldehyde, hydrazine, etc.) to reduce the MO precursor to a pure metal deposit on the substrate.

Before continuing, it should be noted that the metal ink may also comprise other components, e.g., to enhance the inkjet printing process in air or an inert atmosphere at relatively low temperatures. The specific composition of the metal ink may depend at least to some extent on various design considerations. Exemplary design considerations include, but are not limited to, the MO precursor, the substrate that the metal ink is being applied to, and the application that the printed substrate will be used for.

For purposes of illustration, the metal ink may include components, such as, e.g., dispersants, binders, and/or surfactants, for enhancing deposition, resolution, and/or adhesion of the metal inks to the substrate. For example, the surface properties of the ink may be adjusted for higher printing resolution by adding surfactants such as, Triton X-100, alkyl sulfonate, alkyl phosphate and phosphonate, alkyl amine and ammonium, etc.

In addition, one or more process parameters may be adjusted for the particular metal ink being used to optimize the inkjet printing process and/or properties of the printed features. For example, the substrate temperature, gas flow rate, and/or application rate of the metal inks may be adjusted to optimize deposition rate of the metal ink, purity/phase of the deposited metal, and/or adhesion to the substrate. Or for example, the substrate temperature, gas flow rate, and/or application rate of the metal inks may be adjusted to optimize resolution, quality, thickness, conductivity and other electrical properties of the printed features.

The metal inks may be used for coating a substrate with metal (e.g., by spraying, dipping, and/or spinning techniques) and/or for producing metal features on a substrate (e.g., as lines, grids, or patterns) by inkjet printing or other direct-write deposition techniques. In addition, the metal inks may be used in a wide variety of different applications. It is readily appreciated that applications of this technology may include, but are not limited to, printed circuit boards (PCBs), touch-screen display devices, organic light emitting diodes (OLEDs), organic solar cells, cell phone displays, photovoltaic devices (e.g., solar cells), catalysts, decorative coatings, structural materials, optical devices, flexible electronics, and other electronic and micro-electronic devices, to name only a few examples.

In an exemplary embodiment, the metal inks may be inkjet printed on a substrate in air or inert environment (e.g., nitrogen or argon) by heating the substrate to about 180° C. (100-200° C.), and then applying the metal ink using a drop generation rate of about 50 Hz (25-100 Hz). This embodiment results in a deposition rate of about 1 μm per pass. Thicker deposits may be obtained by inkjet printing multiple layers.

Inkjet printing multiple layers of metal inks also enables deposition of a contact formation layer, followed by a separate metal forming layer. Accordingly, the contact formation process can be better controlled, and also results in conductor lines having higher conductivity.

Figure 3:
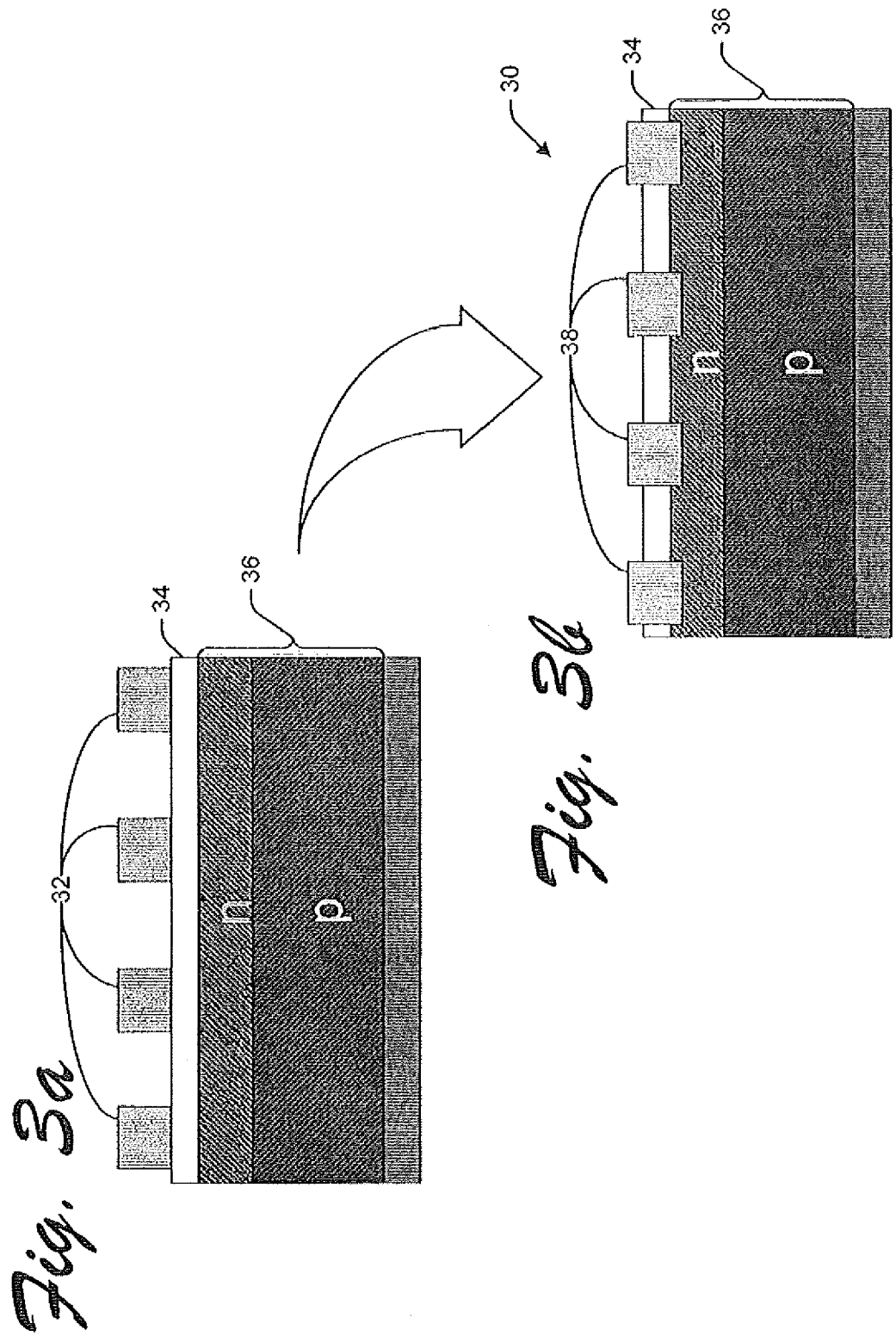
FIGS. 3a and 3b illustrate an exemplary application of fire-through metal inks in the production of solar cells.

FIGS. 3a and 3b illustrate an exemplary application of metal inks (i.e., so called "fire-through" metal inks) in the production of solar cells 30. In traditional silicon solar cell fabrication, a paste containing silver and glass frits is applied to a silicon-nitride anti-reflection (AR) coating over a silicon p-n junction.

This paste helps the silver metal adhere to the AR coating, and enables the silver metal to "burn through" the AR coating and establish electrical contact with the silicon p-n junction. During this process, however, molten glass fits may flow between the silver and the silicon p-n junction, increasing resistance of the contacts and decreasing performance of the solar cells.

The metal inks disclosed herein may be implemented as fire-through metal inks (in place of the glass fits paste) for fabricating solar cells. Use of fire-through metal inks overcome the disadvantages of pastes containing glass frits, while at the same time offering other advantages (e.g., smaller, high resolution contacts resulting in a smaller shadow area). By eliminating glass flits, the fire-through metal inks also eliminate the need for other constituents needed in the pastes for controlling physical properties of the glass frits (e.g., softening agents). Removing these and other constituents of the pastes also helps to improve conductivity and reduce contact resistance in the finished solar cell 30.

In an exemplary embodiment, the fire-through metal inks may comprise soluble chemical precursors (metal complexes and organo-metallic reagents) to various metal oxides. These precursors are provided in a solution containing a particulate metal or metal organic precursor at room temperature. The fire-through metal inks may be applied to the anti-reflection (AR) coating 34 of the solar cell (e.g., by inkjet printing or other deposition techniques), For purposes of illustration, fire-through metal inks are shown by the deposits 32 in FIG. 3a after application on the AR coating 34 by inkjet printing.

The fire-through metal inks may be used at relatively low process temperatures. For example, process temperatures may be in the range of about 200-500° C., well below temperatures considered to be detrimental to solar cells. In addition, the fire-through metal inks may be applied by inkjet printing, spin-coating, or other highly-controlled deposition processes, thereby enabling the production of patterns having uniform and controlled thickness, patterns, and other features.

During and/or following application, the printed ink reacts with the AR coating 34. During this reaction, the oxide precursor and metal precursor decompose (or "burn through") the AR coating 34 and establish electrical contact with the p-n junction 36. For example, the metal deposits 38 are shown following "burn through" in contact with the p-n layer 36 in FIG. 3b. It is noted that the precursor reacts directly at the interface between the metal deposits 38 and the p-n junction, thereby controlling properties of the interface (e.g., size, shape) without adversely affecting conductivity of the metal deposits 38.

In an exemplary embodiment, the metal inks may comprise lead acetate in ethylene glycol. When deposited on the AR coating 34 (e.g., by inkjet printing), the lead acetate is reduced to PbO, forming continuous layers and patterns of controlled thickness, as illustrated in FIG. 3a. The PbO completely etches the AR coating at temperatures as low as about 500° C. after only 10 minutes, as illustrated in FIG. 3b. Increasing the temperature increases the etching rates. For example, increasing the temperature to about 750° C. for 10 min produced 1 μm deep etch pits, which is comparable to rates achieved using commercial glass fits at similar temperatures. In other exemplary embodiments, tin or zinc may be used in place of lead.

It is noted that the fire-through metal inks are not limited to any particular composition or formulation. For example, both mixed and single-oxide liquid chemical precursors may be used to facilitate the "burn-through" process on solar cell substrates having an AR coating. Mixed component solutions may include, but are not limited to, lead (lead acetate, lead formate), boron (such as boric acid) and silicon (silane). Still other chemical precursors may be used. Likewise, other functional components, such as, e.g., reducing agents, binders, and solvents may also be added to the fire-through metal inks to control chemical and/or physical properties of the fire-through metal inks and/or product.

EXAMPLE 1

Metal Inks

The following examples are provided to illustrate production and use of various metal inks that may be inkjet printed to produce metallic features, such as, e.g., layers and patterns on a substrate. The inkjet printing system was operated at 10-60 V, 50-1000 Hz, and using an x-y translation speed of 1-30 min/sec, In one example, nickel inks were produced by adding 0.5 gram (g) nickel(II) formate dihydrate [Ni(HCO$_2$)$_2$.2H$_2$O] to 0.2 miliLiters (mL) ethylene diamine and 2.0 mL ethylene glycol. In this example, the ethylene diamine complexed Ni(II) to make the metal soluble, and the formate served as the reducing agent.

Figure 4:
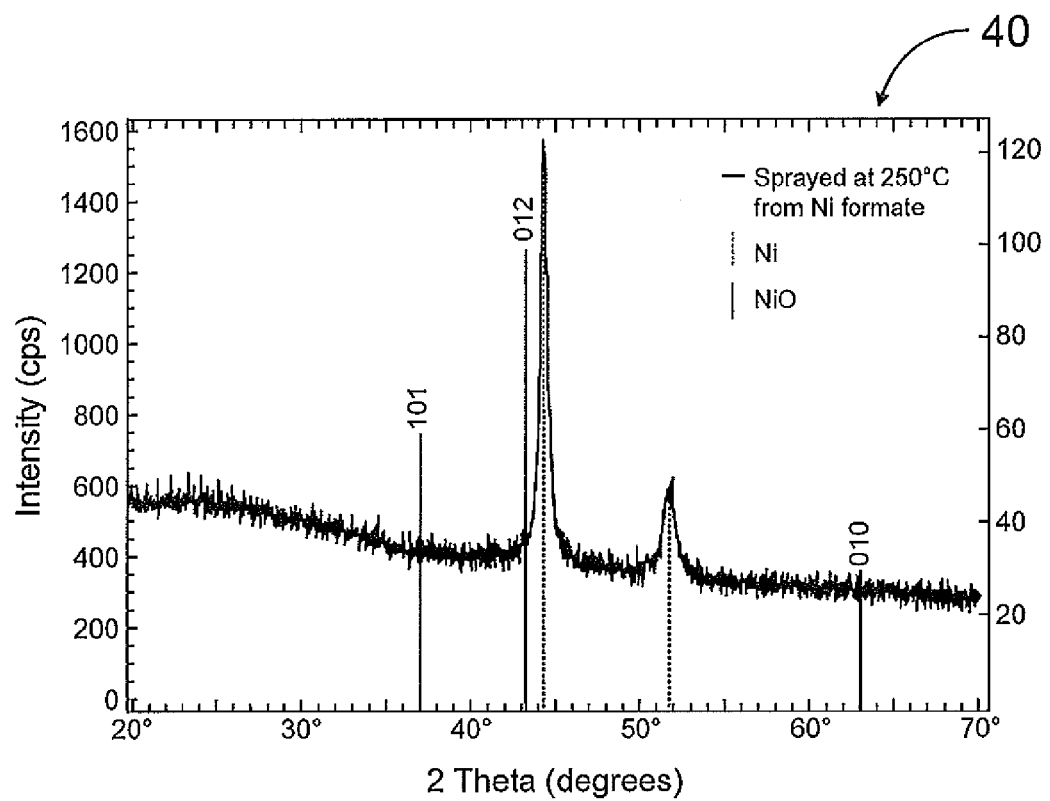
FIG. 4 is a plot showing X-ray diffraction (XRD) analysis of exemplary nickel deposits.

The nickel inks were spray printed on glass substrates in an air environment at temperatures of about 250° C. to produce metallic nickel deposits on the glass. The nickel deposits had electrical properties comparable to bulk nickel. Specifically, a 4 micron layer of Ni metal deposited by spray deposition exhibited a resistivity of about 100 μΩ cm (compared to bulk Ni which has a resistivity of about 7 μΩ cm). X-ray diffraction (XRD) analysis (plot 40 shown in FIG. 4) of the nickel deposits confirmed that the deposit was a pure nickel metal, and other phases of nickel (e.g., NiO) were not present.

In another example, silver (Ag) inks were produced by adding 1.0 g silver trifluoroacetate [Ag(CF$_3$CO$_2$)] to 2.0 mL of ethylene glycol and 0.1 mL Triton X-100. Silver inks were also produced by adding 2.0 g silver trifluoroacetate to 1.5 mL H$_2$O and 0.2 mL ethylene glycol. In this example, the ethylene glycol and Triton X-100 served as the reducing agents and also helped lower the processing temperature for silver formation to 180° C. The Triton X-100 also served as a surfactant for better resolution printing.

In yet another example, copper (Cu) inks were produced by adding 0.2 g copper(II) formate tetrahydrate [Cu(HCO$_2$)$_2$.4H$_2$O] to 0.5 mL ethanolamine and 2.0 mL ethylene glycol. In this example, the ethanolamine increased the solubility of the copper(II) formate tetrahydrate. The formate served as the reducing agent.

Figure 5:
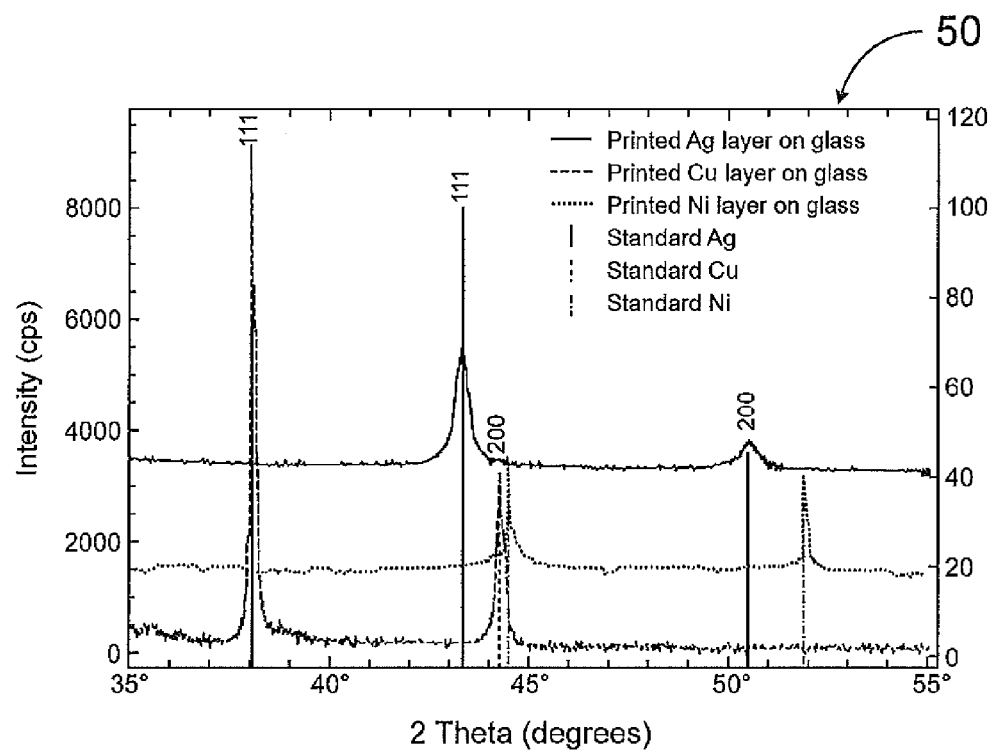
FIG. 5 are plots showing X-ray diffraction (XRD) analysis of exemplary silver, copper, and nickel deposits.

The Ag, Cu and Ni inks were printed on substrates heated to about 200-250° C. in air. Although better results were obtained by inkjet printing metal inks containing Cu in an inert atmosphere (N$_2$ or Ar), copper deposition was also possible in air when followed by rapid thermal processing. In all cases, results of X-ray diffraction analysis (plot 50 shown in FIG. 5) showed that the metal deposits were pure metal, without detectable traces of carbon or oxides.

Figure 6:
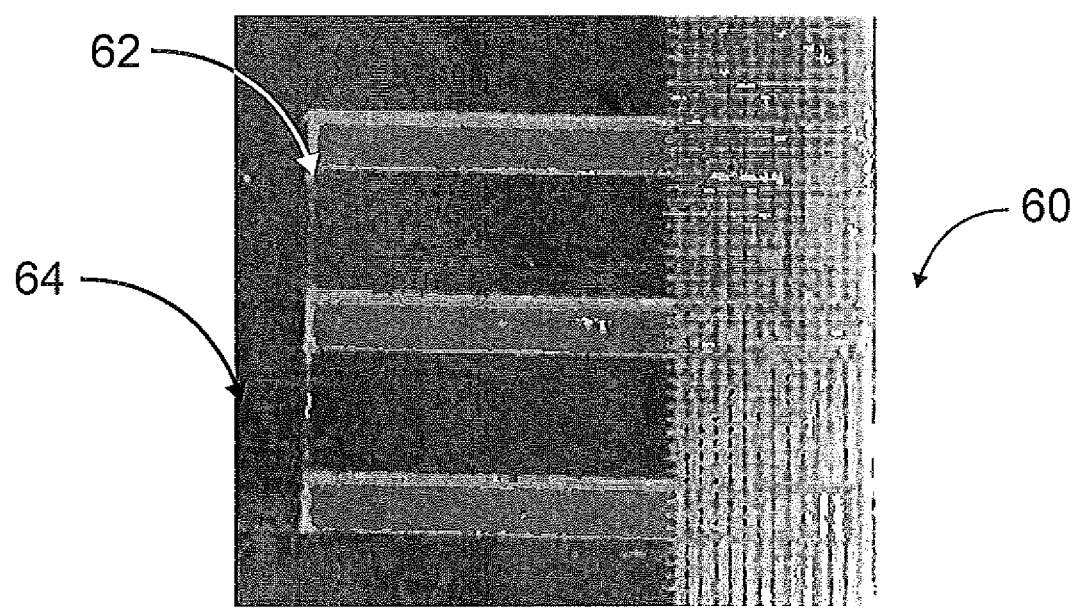
FIG. 6 is a digital photograph showing exemplary copper lines that were inkjet printed on a printed circuit board in a nitrogen environment.
Figure 7:
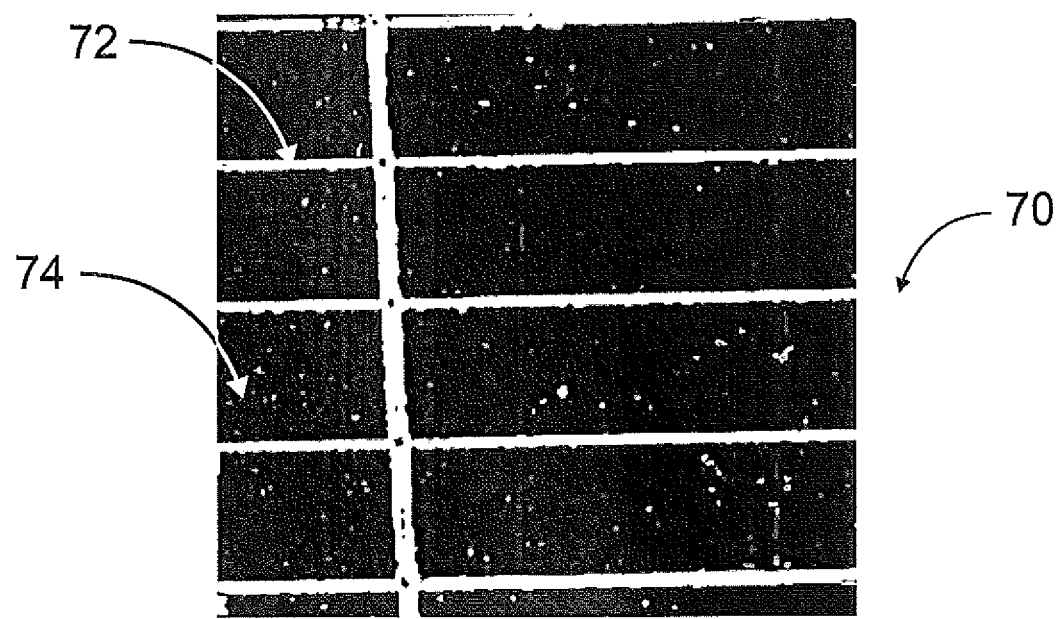
FIG. 7 is a digital photograph showing an exemplary silver grid that was inkjet printed on a silicon solar cell in air.

Thick (up to 15 μm), highly conducting lines of Ag and Cu were printed on a variety of substrates demonstrating good adhesion to glass, silicon, and printed circuit boards. For purposes of illustration, FIG. 6 is a photograph 60 showing 5 μm thick and 300 μm wide copper "lines" 62 that were inkjet printed on a printed circuit board 64 in a nitrogen environment at about 200° C. FIG. 7 is a photograph 70 showing a 10 μm thick and 250 μm wide silver "grid" 72 that was inkjet printed on a silicon solar cell 74 in air at about 200° C.

The metal deposits exhibited conductivities comparable to those of the bulk metals. For example, the silver deposits exhibited conductivities of about 2 μΩ·cm, the copper deposits exhibited conductivities of about 100 μΩ·cm, and the nickel deposits exhibited conductivities of about 100 μΩ·cm. It is noted that the conductivity for the silver deposits is essentially the same as bulk silver metal, and although the resistivity for the copper and nickel deposits is approximately one order of magnitude higher than the bulk metals, these results are comparable to conductivities achieved for copper and nickel deposits using conventional screen printing techniques.

EXAMPLE 2

Fire-through Metal Inks

The following examples are provided to illustrate the production and use of so-called fire-through metal inks that may be inkjet or spray printed on a SiN anti-reflection (AR) coating in the fabrication of solar cells. In this example, the fire-through metal inks were produced by adding 1.0 g lead acetate hydrate [Pb(CH$_3$CO$_2$)2.H$_2$O] to 3.0 mL ethylene glycol.

Figure 8:
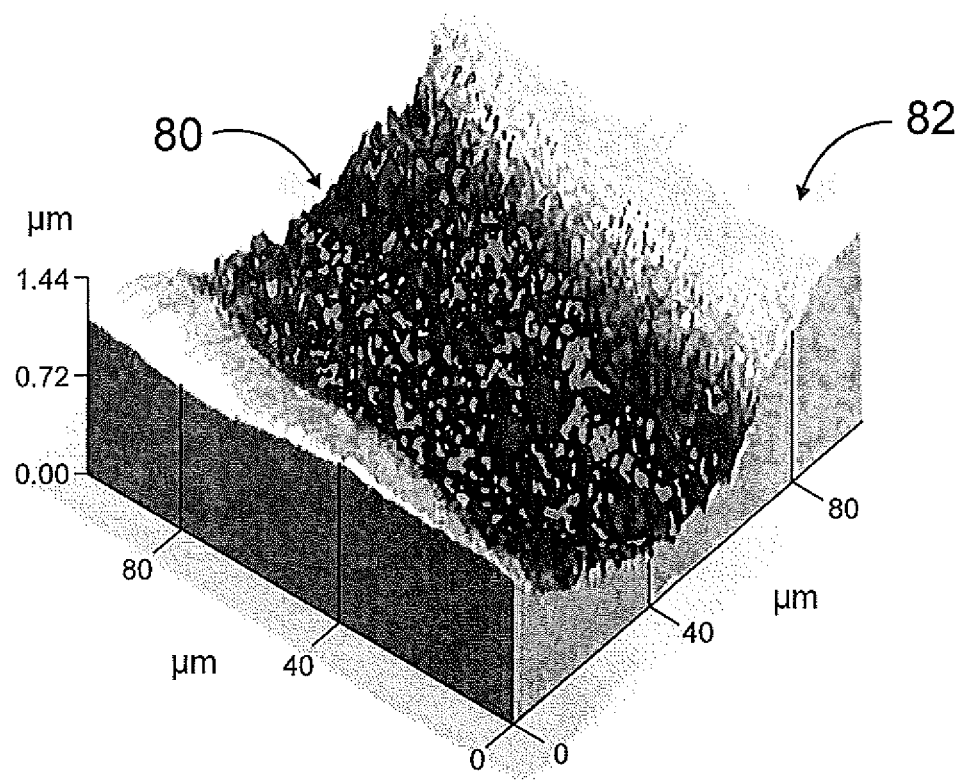
FIG. 8 is a three-dimensional illustration of a pattern etched in an anti-reflection coating for a silicon solar cell using an exemplary fire-through metal ink.

The fire-through metal inks were inkjet printed on the AR coating to produce 15 μm thick, 300 μm wide contacts. Ohmic contacts were achieved at low temperatures (650-750° C.) with a very short annealing cycle (less than one minute). A 1 μm deep, 70 μm wide etch pattern 80 obtained by inkjet printing and consequent thermal processing at 750° C. for 10 min of the AR coating 82 on a silicon p-n junction is shown in FIG. 8. Complete burn-through of the AR coating was observed at temperatures as low as 500 C. Layered printing decreased the processing temperature for contact formation to as low as 650° C., and improved performance of the printed cell.

It is noted that the Examples discussed above are provided for purposes of illustration and are not intended to be limiting. Still other embodiments of processes for the production and use of metal inks will be readily appreciated by those having ordinary skill in the art after understanding the teachings herein.

While a number of exemplary aspects and embodiments have been discussed above, those of skill in the art will recognize certain modifications, permutations, additions and sub combinations thereof. It is therefore intended that the following appended claims and claims hereafter introduced are interpreted to include all such modifications, permutations, additions and sub-combinations as are within their true spirit and scope.

The invention claimed is:

1. A method of using a fire-through metal ink comprising:
providing a photovoltaic device including an anti-reflection coating and a p-n junction;
providing a fire-through metal ink including a solution comprising a first metal complex dissolved in a solvent, the first metal complex including a first metal and a ligand;
depositing the metal ink on the anti-reflection coating;
processing the photovoltaic device at a temperature of 200° C. or greater; and
producing a metal oxide from the first metal complex.

2. The method of claim 1, further comprising burning the metal oxide through the anti-reflection coating and producing an electrical contact with the p-n junction, the electrical contact including the first metal.

3. The method of claim 1, wherein the metal ink further comprises a second metal and the electrical contact further comprises the second metal.

4. The method of claim 2, wherein the anti-reflection coating comprises silicon nitride and the p-n junction comprises silicon.

5. The method of claim 3, wherein the second metal resides in the metal ink in a form selected from the group consisting of (i) a second metal complex, wherein the metal ink further comprises a reducing agent and the second metal complex, both the second metal complex and the reducing agent being dissolved in the solution, and (ii) a particulate metal.

6. The method of claim 3, wherein the first metal is selected from the group consisting of lead (Pb), tin (Sn), and Zinc (Zn), and the second metal is selected from the group consisting of nickel (Ni), copper (Cu), gold (Au), silver (Ag), lead (Pb), palladium (Pd), platinum (Pt), cobalt (Co), iron (Fe), and Tin (Sn).

7. The method of claim 5, further comprising reacting the second metal complex with the reducing agent at a processing temperature above 150° C., wherein the second metal complex and the reducing agent are substantially unreactive toward each other in the metal ink at room temperature.

8. The method of claim 7, wherein the second metal complex comprises a metal ion, and reacting the second metal complex with the reducing agent reduces the metal ion.

9. The method of claim 2, wherein the burning of the metal oxide through the antireflection coating is performed at a process temperature of 500° C. or greater.

10. The method of claim 9, wherein the burning of the metal oxide through the anti-reflection coating is performed at a process temperature at or below 750° C.

11. The method of claim 1, wherein the metal oxide resides on or in the antireflection coating.

12. The method of claim 1, wherein the metal ink is deposited on the antireflection coating by a deposition technique selected from the group consisting of spray printing and inkjet printing.

13. The method of claim 5, wherein the metal ink is deposited on the antireflection coating by a deposition technique selected from the group consisting of spray printing, inkjet printing, dipping, spinning, and direct-write deposition.

14. The method of claim 3, wherein the electrical contact is an ohmic contact and the method is performed in the absence of a paste comprising glass fits and a metal.

15. A method of using a fire-through metal ink comprising:
providing a photovoltaic device including an anti-reflection coating and a p-n junction;
depositing a fire-through metal ink on the anti-reflection coating, the metal ink including a first metal complex dissolved in a solvent, the first metal complex comprising a first metal and a ligand;
processing the photoelectric device at a temperature of 500° C. or greater;
producing a metal oxide from the first metal complex; and
burning the metal oxide through the anti-reflection coating.

16. The method of claim 15, wherein the metal ink further comprises a second metal, the second metal being in a form selected from the group consisting of (i) a second metal complex, the second metal complex and a reducing agent being dissolved in the metal ink and being substantially unreactive toward each other at room temperature, and (ii) a particulate metal.

17. The method of claim 16, further comprising producing an electrical contact on the p-n junction, wherein the electrical contact is ohmic and the method is performed without using a glass frit paste.

18. A method of using a fire through metal ink comprising:
providing a fire-through metal ink including a first metal complex dissolved in a solvent, the first metal complex comprising a first metal and a ligand;
providing a photoelectric device including a anti-reflection coating and a p-n junction;
delivering the metal ink onto the anti-reflection coating;
processing the photovoltaic device at a temperature of 200° C. or greater;
producing a metal oxide from the first metal complex; and
burning the metal oxide through the anti-reflection coating.

19. The method of claim 18, further comprising producing an electrical contact with the p-n junction, the electrical contact including the first metal and a second metal, wherein the metal ink further includes the second metal in the form of a particulate metal.

20. The method of claim 18, further comprising:
reacting a second metal complex and a reducing agent, wherein the metal ink further includes the second metal complex and the reducing agent;
producing an electrical contact with the p-n junction, the electrical contact including the first metal and a second metal, the second metal coming from the second metal complex.

* * * * *